United States Patent
Deshpande et al.

(10) Patent No.: US 12,444,184 B2
(45) Date of Patent: Oct. 14, 2025

(54) SYSTEM AND METHOD FOR GENERATING HYPERSPECTRAL ARTIFICIAL VISION FOR MACHINES

(71) Applicant: Tata Consultancy Services Limited, Mumbai (IN)

(72) Inventors: Shailesh Shankar Deshpande, Pune (IN); Karan Sharad Owalekar, Thane West (IN); Apoorva Khanna, New Delhi (IN); Mahesh Kshirsagar, Mumbai (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 292 days.

(21) Appl. No.: 18/234,913

(22) Filed: Aug. 17, 2023

(65) Prior Publication Data

US 2024/0096080 A1  Mar. 21, 2024

(30) Foreign Application Priority Data

Sep. 19, 2022 (IN) .............................. 202221053465

(51) Int. Cl.
*G06V 10/82* (2022.01)
*G06V 10/58* (2022.01)
*G06V 10/776* (2022.01)

(52) U.S. Cl.
CPC .............. *G06V 10/82* (2022.01); *G06V 10/58* (2022.01); *G06V 10/776* (2022.01)

(58) Field of Classification Search
CPC ...... G06V 10/82; G06V 10/58; G06V 10/776; G06V 10/56; G06V 10/778; G06V 10/764;

(Continued)

(56) References Cited

U.S. PATENT DOCUMENTS 10,432,977 B2 * 10/2019 Atkins ................... H04N 19/46
11,275,959 B2 * 3/2022 Rowe ..................... G06V 40/40
(Continued)

FOREIGN PATENT DOCUMENTS

CN  113689423 A  11/2021

OTHER PUBLICATIONS

Mahami et al., "Material Recognition for Automated Progress Monitoring using Deep Learning Methods," (2020).
(Continued)

*Primary Examiner* — Michael S Osinski
(74) *Attorney, Agent, or Firm* — Finnegan, Henderson, Farabow, Garrett & Dunner LLP

(57) ABSTRACT

Embodiments herein provide a method and system for a hyperspectral artificial vision for machines. The system receives a hyperspectral signal of a target material as an input to a neural network model. The system initializes by selecting the number of primitive layers to be used. The system iteratively cycles through all training data (pixels) and updating weights for each unsuccessful material class prediction. Model with two primitives serves as baseline, after which the system adds another primitive layer and repeats the training procedure. The system keeps repeating these processes until obtains convergence. Where the system come to a halt, the system obtains the optimal number of primitives for the given materials. The generated new color pixel is used as a discriminator to aid in locating the target material. The new artificial color is a mixture of weighted chromatic primitives which are optimized for sensitivity/ (Spectral Response Functions) SRFs.

20 Claims, 7 Drawing Sheets

(58) Field of Classification Search
CPC .......... G06N 3/08; G06N 3/045; G06N 20/00; G06T 2207/20081; G06T 2207/20084; G06T 2207/10036; H04N 19/46; H04N 19/117; H04N 19/186; H04N 19/85; H04N 19/98

See application file for complete search history.

(56) References Cited

U.S. PATENT DOCUMENTS

| | | | | |
|---|---|---|---|---|
| 11,651,602 | B1* | 5/2023 | Tschernezki | G06V 10/803 |
| | | | | 382/157 |
| 11,776,124 | B1* | 10/2023 | Behrooz | G06T 5/50 |
| | | | | 382/128 |
| 12,190,573 | B1* | 1/2025 | Li | G06V 20/13 |
| 2018/0005089 | A1* | 1/2018 | Pham | G06T 7/77 |
| 2021/0056391 | A1* | 2/2021 | Hart | G06F 9/547 |
| 2022/0114403 | A1* | 4/2022 | Shaw | G06F 18/23213 |
| 2023/0084705 | A1* | 3/2023 | Su | H04N 19/46 |
| | | | | 375/240.02 |
| 2023/0368344 | A1* | 11/2023 | Su | G06T 5/90 |
| 2023/0408550 | A1* | 12/2023 | Pickerd | G06N 3/08 |
| 2024/0283975 | A1* | 8/2024 | Gadgil | H04N 19/85 |
| 2025/0069361 | A1* | 2/2025 | Yoo | G06V 10/42 |

OTHER PUBLICATIONS

Parmar et al., "Selection of Optimal Spectral Sensitivity Function for Color Filter Arrays," IEEE Transactions on Image Processing, vol. 19 (2010).

Takatani et al., "One-shot Hyperspectral Imaging using Faced Reflectors," (2017).

* cited by examiner

SYSTEM AND METHOD FOR GENERATING HYPERSPECTRAL ARTIFICIAL VISION FOR MACHINES

CROSS-REFERENCE TO RELATED APPLICATIONS AND PRIORITY

This U.S. patent application claims priority under 35 U.S.C. § 119 to Indian Application number 202221053465, filed on Sep. 19, 2022. The entire contents of the aforementioned application are incorporated herein by reference.

TECHNICAL FIELD

The disclosure herein generally relates to the field of machine vision and more specifically, to a method and system for generating a hyperspectral artificial vision for machines.

BACKGROUND

Machine vision (MV) is the systems and methods used to provide imaging-based automatic inspection and analysis for applications such as automatic inspection, process control, and robot guidance, usually in industries. Machine vision refers to many technologies, software and hardware products, integrated systems, actions, methods, and expertise. It attempts to integrate existing technologies in new ways and apply them to solve real world problems. The machine vision is the prevalent one for these functions in industrial automation environments but is also used for these functions in other environment vehicle guidance.

A biotic vision uses natural light reflected from an object to extract spatial, temporal, and chemical properties of the object. The spatial properties are geometric properties of the object such as size and shape, surface texture and so on and the temporal properties are motion of the object. The chemical properties are chemical composition of object or material of the object. The chemical properties are commonly acquired using color. Color is a psychological phenomenon which associates certain mental sensation (which commonly called as a color) with the energy reflected by the object. This is by tapping into the energy matter interaction at a molecular level. Depending upon the material and its chemical composition, energy of certain wavelengths is absorbed by the material and the rest is reflected, (some part is scattered away from the direction of the viewer). For example, ripe mango would appear red whereas, young would appear green, a dry green leaf appears yellow as they reflect both red and green, whereas a fresh leaf appears green because red is absorbed by chlorophyl in the leaf. Thus, color is a discriminator designed for separating objects/or detecting objects, especially indicating chemical composition.

Certain animals have more primitives than humans, which have evolved to help them better perceive their surroundings (i.e., 3 primitives for humans, 4 primitives for birds, and 16 primitives for mantis shrimps). The adequate number of primitives varies depending on the set of materials to be seen by a machine. Usually, color is being used as a discriminator, which can aid in locating the target material. To determine the optimal numbers of primitives is practically impossible as this entail changing sensors or filters dynamically during a robot/machine operation.

The existing MV systems typically use filters to capture the light in blue (~400-500 nm) green (~500-600 nm) and red (~600-700 nm) wavelength range (called as bands henceforth). The signal from each range is sensed by a Charge Coupled Device (CCD) and the electrical response of the CCD is treated a trichromatic primitive. Though, it shows the scene with colors similar to human vision, the vision is limited to combination of three primitives. The three primitives are not necessarily right quantity of primitives and so does the human sensitivity functions. Thus, the current mechanism is incapable of enhancing the color or creating color discriminator fora given task a robot/machine can perform. This is because the power distribution spectrum (intensity vs wavelength plot of a reflected light from an object) of the object/s is lost in broad band data collection. Resampling such a degraded signal with more primitives is not possible unless and until the original power distribution spectrum is retrieved. The hyperspectral imaging techniques uses narrow bands to collect the data, however none of the present system use or create a discriminator which is like a color or is a color for discriminating objects.

SUMMARY

Embodiments of the disclosure present technological improvements as solutions to one or more of the above-mentioned technical problems recognized by the inventors in conventional systems. For example, in one embodiment, a method and system for generating a hyperspectral artificial vision for machines is provided.

In one aspect, a processor-implemented method for generating a hyperspectral artificial vision for machines is provided. The processor-implemented method comprising receiving via an input/output interface receiving a hyperspectral signal of a target material to be detected as an input to a neural network model, reshaping each signal vector of the plurality of spectral bands to a predefined shape, dividing the reshaped signal vector of the plurality of spectral bands into a plurality of batches, training the neural network model iteratively for each of the plurality of batches of the reshaped signal vector to update weight for each unsuccessful material class prediction, initializing two or more chromatic primitives of the trained neural network model, optimizing a chromatic primitive sensitivity function using an adaptive moment estimation to achieve optimized weights of the initialized two or more chromatic primitives, evaluating performance of the neural network model at each iteration to obtain two or more chromatic primitives from the plurality of initialized artificial color primitives, generating a new artificial color value for one or more pixels by combining node of the each of the obtained two or more chromatic primitives, and predicting an image for the generated new color using the learned two or more chromatic primitive sensitivity functions to detect the target material.

In another aspect, a system for generating a hyperspectral artificial vision for machines is provided. The system includes an input/output interface configured to receive a hyperspectral signal of a target material to be detected as an input to a neural network model, wherein the hyperspectral signal comprising a plurality of spectral bands, one or more hardware processors and at least one memory storing a plurality of instructions, wherein the one or more hardware processors are configured to execute the plurality of instructions stored in the at least one memory.

Further, the system is configured to reshape each signal vector of the plurality of spectral bands to a predefined shape, divide the reshaped signal vector of the plurality of spectral bands into a plurality of batches train the neural network model iteratively for each of the plurality of batches of the reshaped signal vector to update weight for each unsuccessful material class prediction, initialize two or more chromatic primitives of the trained neural network model, optimize a chromatic primitive sensitivity function using an adaptive moment estimation to achieve optimized weights of the initialized two or more chromatic primitives, evaluate performance of the neural network model at each iteration to obtain two or more chromatic primitives from the plurality of initialized artificial color primitives, generate a new artificial color value for one or more pixels by combining node of the each of the obtained two or more chromatic primitives, and predict an image for the generated new color using the learned two or more chromatic primitive sensitivity functions to detect the target material.

In yet another aspect, one or more non-transitory machine-readable information storage mediums are provided comprising one or more instructions, which when executed by one or more hardware processors causes a method for generating a hyperspectral artificial vision for machines. The processor-implemented method comprising receiving via an input/output interface receiving a hyperspectral signal of a target material to be detected as an input to a neural network model, reshaping each signal vector of the plurality of spectral bands to a predefined shape, dividing the reshaped signal vector of the plurality of spectral bands into a plurality of batches, training the neural network model iteratively for each of the plurality of batches of the reshaped signal vector to update weight for each unsuccessful material class prediction, initializing two or more chromatic primitives of the trained neural network model, optimizing a chromatic primitive sensitivity function using an adaptive moment estimation to achieve optimized weights of the initialized two or more chromatic primitives, evaluating performance of the neural network model at each iteration to obtain two or more chromatic primitives from the plurality of initialized artificial color primitives, generating a new artificial color value for one or more pixels by combining node of the each of the obtained two or more chromatic primitives, and predicting an image for the generated new color using the learned two or more chromatic primitive sensitivity functions to detect the target material.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
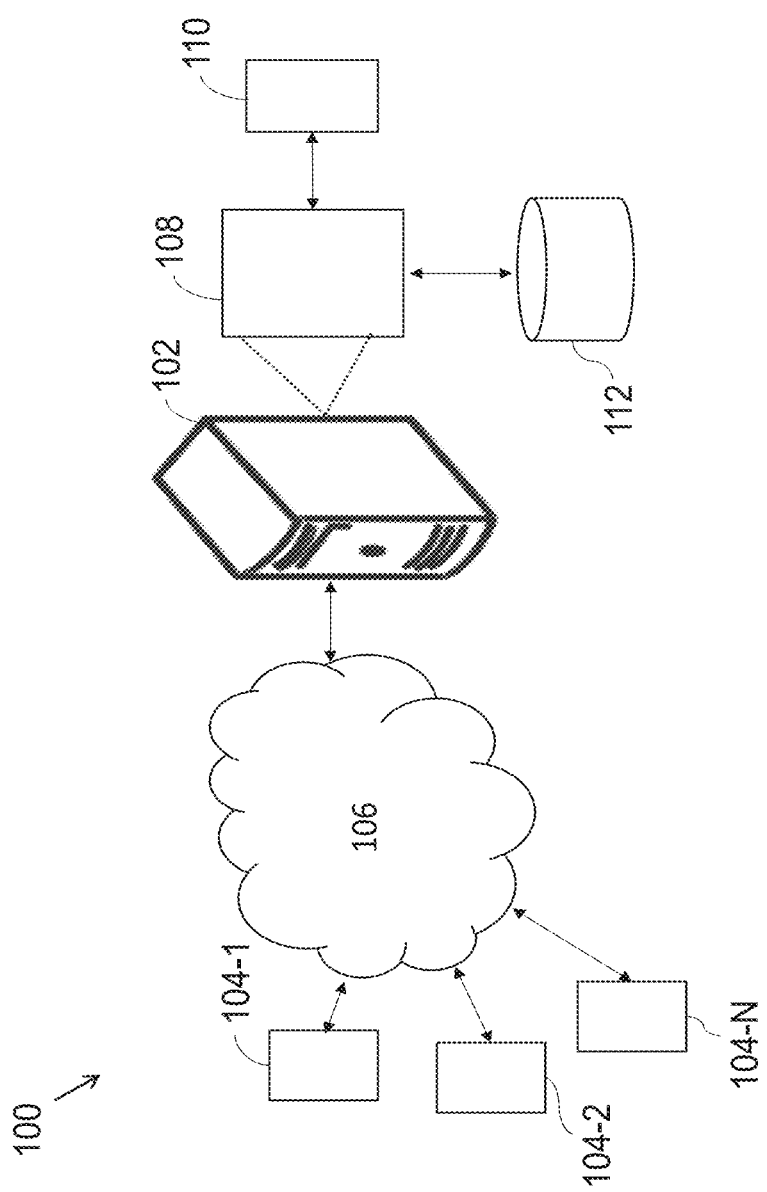
FIG. 1 illustrates a block diagram of an exemplary system for generating a hyperspectral artificial vision for machines, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for generating a hyperspectral artificial vision for machines. It should be appreciated that a biotic vision uses natural light reflected from the object to extract the spatial, temporal, and chemical properties of the object. Spatial properties of the object include geometric properties such as size and shape, surface texture and so on. The temporal properties of the object include objects motion and chemical properties include chemical composition of object or material of the object. The last property is in common sense is a color. Color is a psychological phenomenon which associates certain mental sensation (which commonly called as a color) with the energy reflected by the object. This is by tapping into the energy matter interaction at the molecular level. Depending upon the material and its chemical composition energy of certain wavelengths is absorbed by the material and the rest is reflected, (some part is scattered away from the direction of the viewer). For example, ripe mango would appear red whereas, young would appear green, a dry green leaf appears yellow as they reflect both red and green, whereas a fresh leaf appears green because red is absorbed by chlorophyl in the leaf. Thus, color is a discriminator designed for separating objects/or detecting objects, especially indicating chemical composition.

The biotic vision comprising elements such as optical components, sensors, perceptual computation that is color (by layers of natural neural network). Herein, the sensors determine how they respond to the light Humans have three cones responding to short wavelengths (~400 nm to ~500 nm), medium wavelengths (~500 nm to ~600 nm) and longer wavelengths (~600 nm to ~700 nm) in visible spectrum. They are corresponding to the blue, green, and red sensation. All the colors are seen as result of excitations of these cones in some degree. These are not exclusive regions as the response functions peak at certain wavelengths and the limbs of response function overlap each other. Thus, any color is a sensation resulted combination of excitement of three types of cones. For example, 100% excitation of red and green results in yellow color sensation. Design of sensors and neural processing thus entails deciding number of sensors or primitives, their spectral response function, positions for peaks (band centers), distance between peaks (band centers) and neural connection to process the signal.

The adequate number of primitives varies depending on the set of materials to be seen by a machine, therefore objective here is to determine appropriate number of primitives as well as spectral response functions (SRFs). Color is being used as a discriminator in this case, which can aid in locating the target material. Thus, any sensing system of the camera or robot vision uses only three primitives and sensitivity function similar to humans and detect the color. The control and actuation system then acts on the perceived scene as programed. For example, a machine/robot picks up the fruits which are mature and discards all the green ones. The machine locates the red object in the scene and directs its gaze toward the same.

Referring now to the drawings, and more particularly to FIG. 1 through FIG. 7B, where similar reference characters denote corresponding features consistently throughout the figures, there are shown preferred embodiments and these embodiments are described in the context of the following exemplary system and/or method.

FIG. 1 illustrates a block diagram of a system (100) for generating a hyperspectral artificial vision for machines, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory with a plurality of instructions, one or more databases (112), and one or more hardware processors (108) which are communicatively coupled with the at least one memory to execute a plurality of modules (114) therein. The components and functionalities of the system (100) are described further in detail.

Herein, the one or more I/O interfaces (104) are configured to receive a hyperspectral signal of a target material as an input to a neural network model. The hyperspectral signal comprising a plurality of spectral bands. It is to be noted that the hyperspectral signal may come from a small ground sample in case of a spectrometer data, and it may come as a sequence of signals from a grid of rows and columns. Further, the system (100) reshapes each signal vector of the plurality of spectral bands to a predefined shape.

Figure 2:
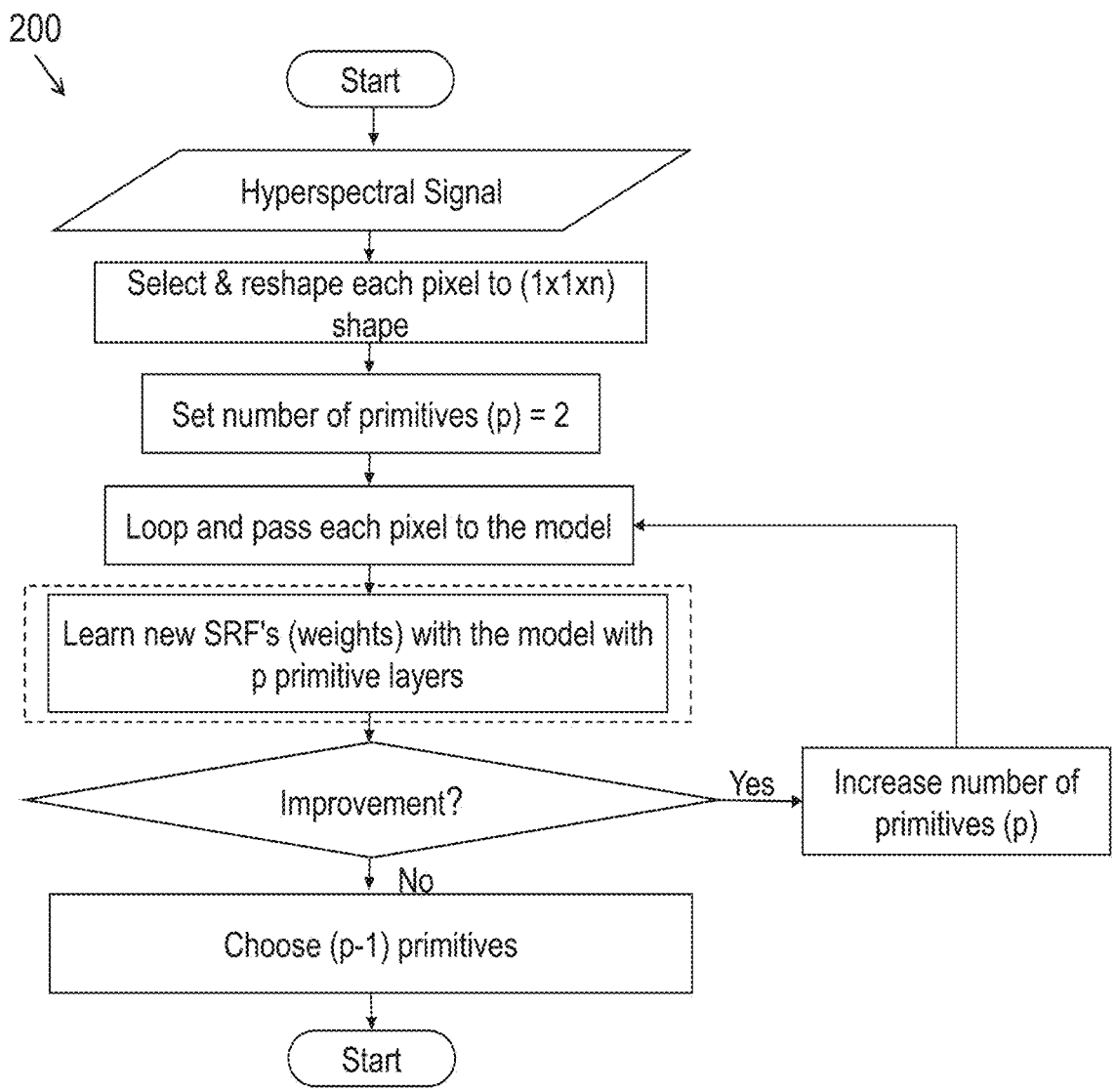
FIG. 2 is a flowchart to illustrate the system for generating a hyperspectral artificial vision for machines, in accordance with some embodiments of the present disclosure.

Referring FIG. 2, a flow diagram (200), illustrating the system (100) for generating a hyperspectral artificial vision for machines, in accordance with some embodiments of the present disclosure. The system (100) initializes two or more chromatic primitives of the neural network model. The two or more chromatic primitives varies depending on the target material to be seen by a machine. The system (100) initializes by selecting the number of primitive layers to be used. This may be done dynamically in the outer flow where the system (100) keeps adding more primitives as explained above. As an activation function, the system (100) chooses either relu or sigmoid. These hyperparameters are used to define the neural network model. Further, the system (100) loops for n epochs. Data is divided into batches for each epoch. The system (100) selects an Adam optimizer, wherein the Adam is an optimization technique that can be used instead of the classical stochastic gradient descent procedure to update network weights iterative based in training data. Weights are updated after each batch. Once all of the batches have been used for training, the system (100) is configured to compute the loss and metrics specified during the model compilation. These metrics and weights are saved, and the model is trained for another epoch.

Further, the system (100) is configured to divide the reshaped signal vector of the plurality of spectral bands into a plurality of batches and trains the neural network model for each of the plurality of batches.

Figure 3:
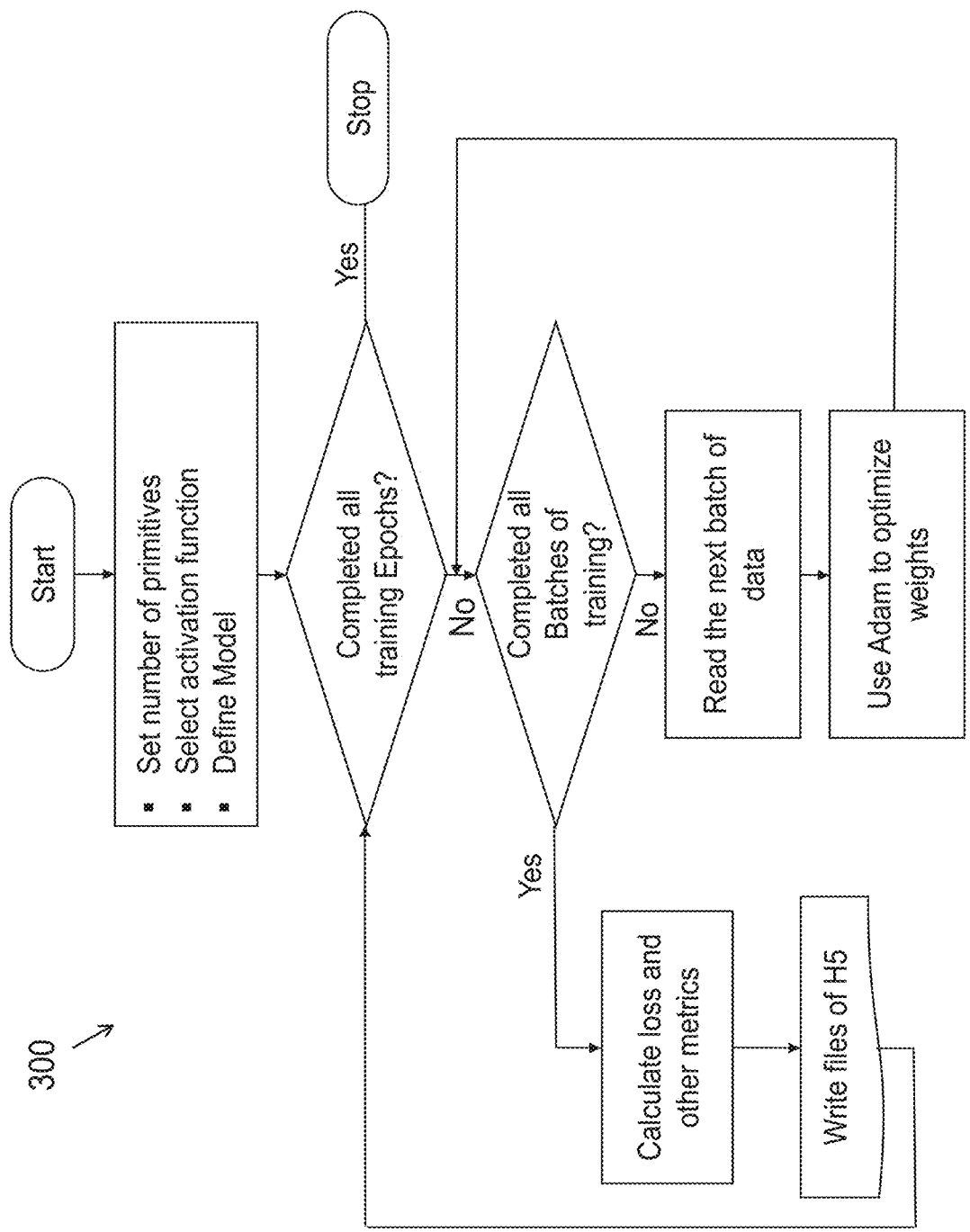
FIG. 3 is a flowchart to illustrate training of a neural network model, in accordance with some embodiments of the present disclosure.

Referring FIG. 3, a flow diagram (300), illustrating the training of the neural network model, in accordance with some embodiments of the present disclosure. Herein, a hyperspectral data cube to obtain spectral signatures and its ground truth file is being used to get signature labels. The input to the neural network is a single pixel which has information across all wavelengths. The input is reshaped to 1*1*n where n denotes the number of bands in the hyperspectral image. Aim is to discover the best number of primitives (p), and thus starts with p=2. The system (100) iteratively cycles through all training data (pixels) and updating weights for each unsuccessful material class prediction. The model with two primitives serves as baseline, after which the system (100) adds another primitive layer and repeats the training procedure.

After training, the system (100) is configured to compare it to see if there is any significant improvement in the new model over the previous model. If there is growth, the system (100) may continue to add more primitive layers. The system (100) keeps repeating these processes until obtains convergence, i.e., the new model does not improve. This is where the system (100) come to a halt, and the system (1000 obtains the optimal number of primitives for the given materials (p−1).

In another example, for a Pavia Centre dataset, the system (100) begins with two primitives. The system (100) continued to add more primitive layers. However, the neural network model with p=5 primitives did not show any significant improvement over the model with p=4, so the system stops here and get the optimal number as (p−1=4) and SRF's for those four primitives.

Figure 4:
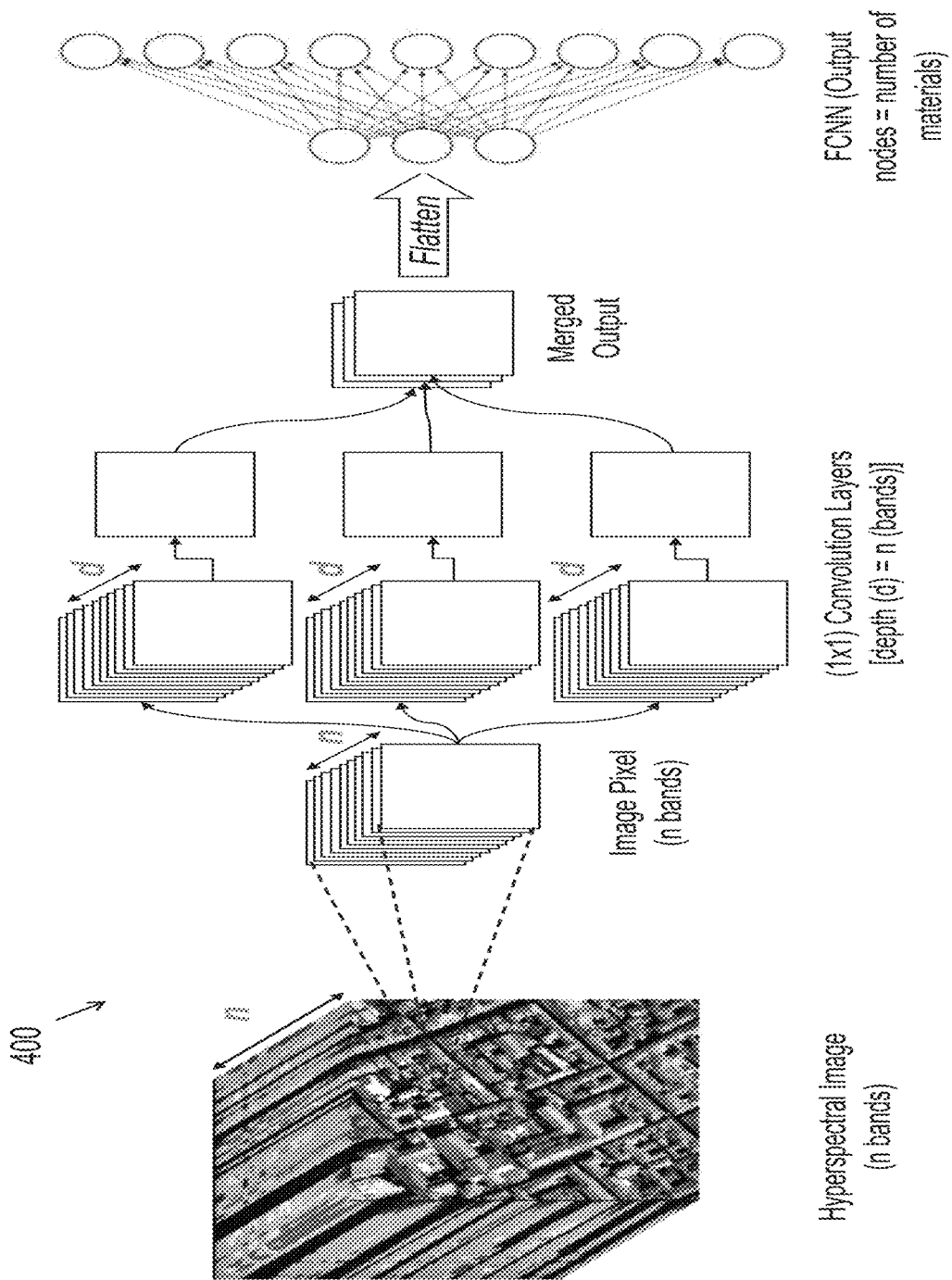
FIG. 4 is a schematic diagram to illustrate a hyperspectral data cube with n bands followed by a neural network model architecture, in accordance with some embodiments of the present disclosure.

Referring FIG. 4, a schematic diagram (400) to illustrate a hyperspectral data cube with n bands followed by the neural network model architecture, in accordance with some embodiments of the present disclosure. For training, the system (100) uses a single pixel at a time, which is represented by grey squares. This input signature is sent to p primitive layers (here p=3). These are 1×1 Convolution layers with a depth of d, where d and n are both equal. Each of these layers produces one output. To get new values, the system (100) stacks them. These results are then fed into a fully connected neural network, which predicts their class.

Further, the system (100) is configured to optimize a chromatic primitive sensitivity function using an adaptive moment estimation to achieve optimized weights of the initialized two or more chromatic primitives.

In another embodiment, the system (100) is configured to evaluate performance of the neural network model at each iteration to obtain two or more chromatic primitives from the plurality of initialized artificial color primitives, wherein halting the training when convergence is obtained.

Figure 5:
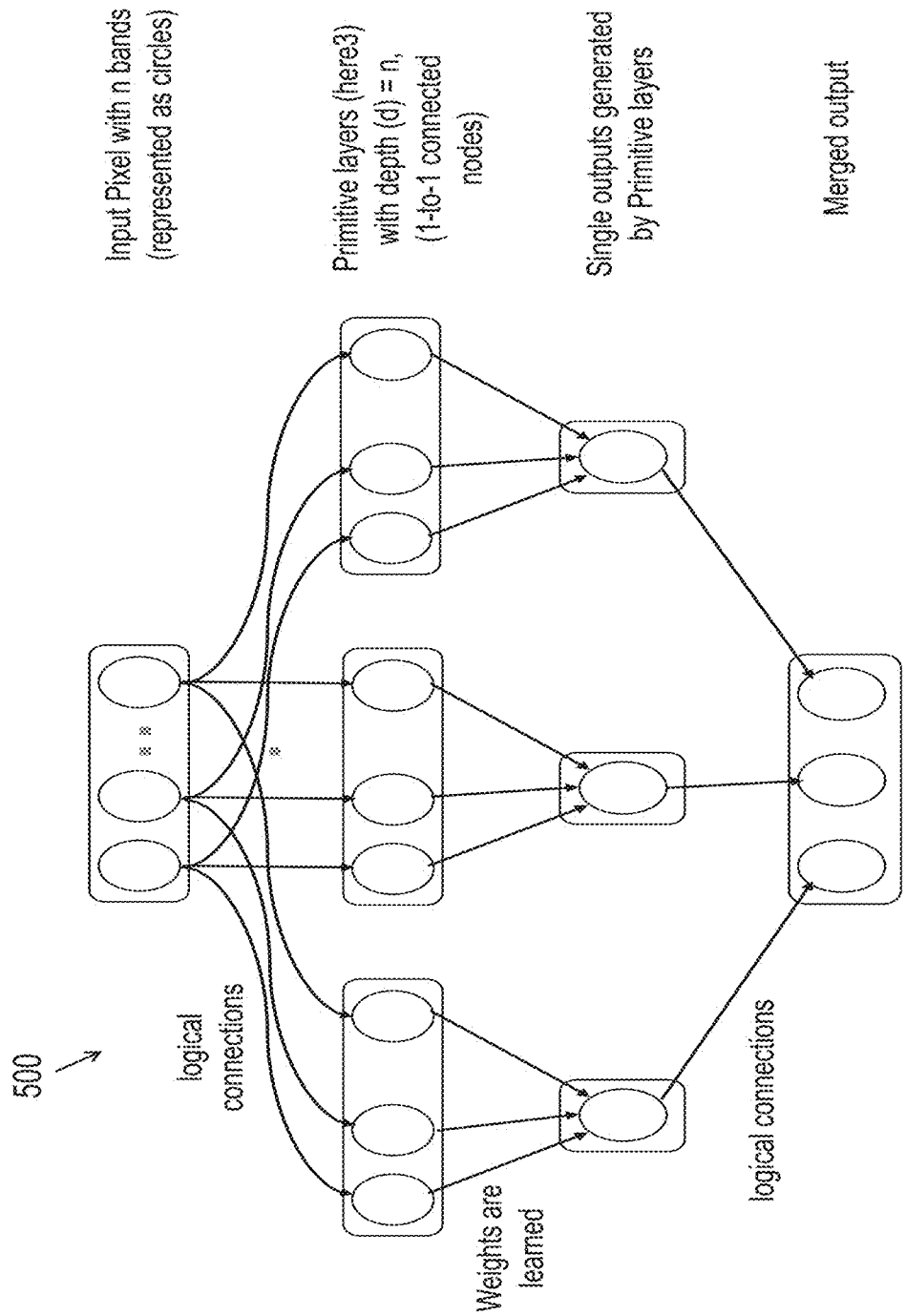
FIG. 5 is a schematic diagram depicts a thorough perspective of the neural network architecture, in accordance with some embodiments of the present disclosure.

In the FIG. 5, a schematic diagram (500) depicts a thorough perspective of a neural network architecture, in accordance with some embodiments of the present disclosure. As an input, the spectral signatures of n bands are used. These layers are linked to parallel primitive layers of depth d. The architecture presented above is made up of three primitives. The architecture begins with two primitive layers, and the number of layers increases as it converges to an optimal number. Each input node is linked to a single primitive layer node. These are logical connections, and weights are not learned here. These primitive layers, which are made up of 1×1 CNN layers, produce a single node output. So, the system (100) gets a connection to a single node from n nodes. This is where the model learns weights. Weights learned by these primitive layers (1×1 convolution layers) are interpreted as spectral response functions SRFs. The system (100) creates an SRF for each primitive layer. These single pixel outputs are now stacked to generate new color pixel values. Using pretrained SRF values, these color values can be used to generate images.

In yet another embodiment, the system (100) is configured to generate a new artificial color value for one or more pixels by combining node of the obtained each of the two or more chromatic primitives, wherein new artificial color is a combination of signals created by a linear combination of two or more chromatic primitives. The generated new color pixel is used as a discriminator to aid in locating the target material. The new artificial color is a mixture of weighted chromatic primitives which are optimized for sensitivity/ (Spectral Response Functions) SRFs. These Spectral Response Functions (SRFs) can then be transferred to an online deployable system to detect target material. To better complement fresh target content, these SRFs can be updated online, or a new Reinforcement Learning (RL) approach may be applied.

The SRFs can be deployed to an embedded machine which has to perform target detection, this type of deployment is done when the machines scan for different types of materials which are already known to the model as the model has already learned SRFs for these materials. The SRFs can also be deployed in real time systems where the target to be detected is unknown, in this scenario the model learns new SRFs dynamically by finding the optimal n for a particular combination of target and data. Learned SRFs performed considerably better than human vision for a given scene/set of materials, and that more primitives may be necessary to better identify target material. The number of primitives varies based on the materials, as do the SRFs for those primitives.

Further, the system (100) is configured to predict an image for the generated new color using the learned two or more chromatic primitive sensitivity function to detect the target material. It is to be noted that the trained neural network model enabled with color sensitive functions and two or more chromatic primitives to run on a neuro-morphic chip, the neuro-morphic chip is enabled with the optimal artificial hyperspectral color vision as an integral part of the machine vision system (100).

Figure 6:
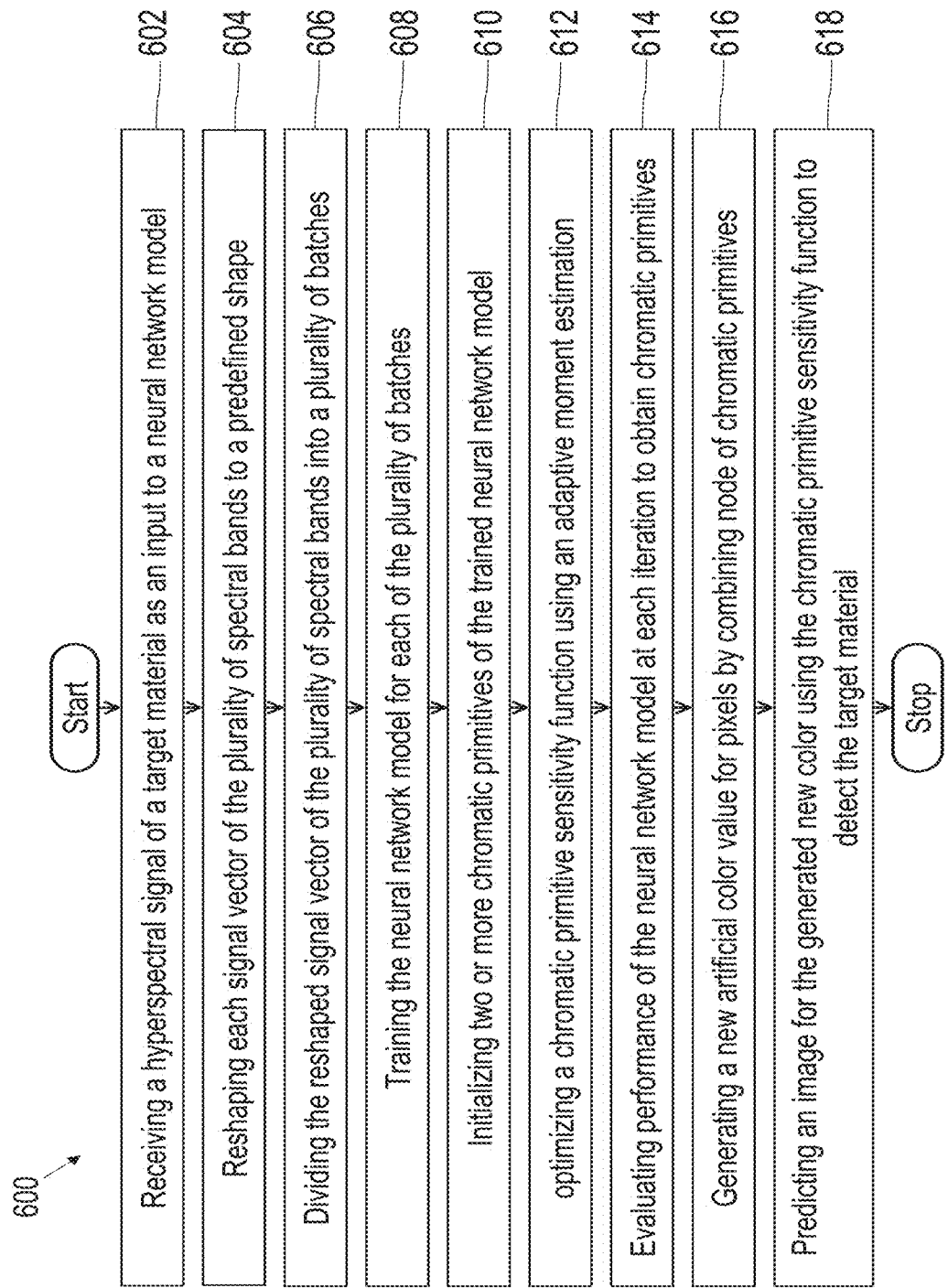
FIG. 6 is a flow diagram to illustrate a method for generating a hyperspectral artificial vision for machines, in accordance with some embodiments of the present disclosure.

Referring FIG. 6, to illustrate a processor-implemented method (600) for generating a hyperspectral artificial vision for machines. Initially, at step (602), receiving, via an input/output interface, a hyperspectral signal of a target material as an input to a neural network model. The hyperspectral signal comprising a plurality of spectral bands. The hyperspectral signal may come from a small ground sample in case of a spectrometer data, wherein the hyperspectral signal come as a sequence of signals from a grid of rows and columns.

At the next step (604), reshaping each signal vector of the plurality of spectral bands to a predefined shape. The reshaping is essential for preparing the data so that 2-dimension convolution can be performed on this.

At the next step (606), dividing the reshaped signal vector of the plurality of spectral bands into a plurality of batches. Here, the plurality of spectral bands into different batches as entire data cannot be used to train because of limited memory. So, the system determines batch size and data is divided into n batches of that size per epoch.

At the next step (608), training the neural network model for each of the plurality of epochs. At the next step (610), initializing two or more chromatic primitives of the trained neural network model. At the next step (612), optimizing a chromatic primitive sensitivity function using an adaptive moment estimation to achieve optimized weights of the initialized two or more chromatic primitives. At the next step (614), evaluating performance of the neural network model at each iteration to obtain two or more chromatic primitives from the plurality of initialized artificial color primitives, wherein halting the training when convergence is obtained.

At the next step (616), generating a new artificial color value for one or more pixels by combining node of the obtained each of the two or more chromatic primitives, wherein new artificial color is a combination of signals created by a linear combination of two or more chromatic primitives. The two or more chromatic primitives varies depending on the target material to be seen by a machine. The two or more chromatic primitives are learned optimal chromatic primitive sensitivity function. The new artificial color is a mixture of weighted chromatic primitives which are optimized for sensitivity/SRF. The generated new color pixel is used as a discriminator to aid in locating the target material.

At the next step (618), predicting an image for the generated new color using the learned two or more chromatic primitive sensitivity function to detect the target material. Further, the trained neural network model enabled with color sensitive functions and two or more chromatic primitives to run on a neuro-morphic chip. The neuro-morphic chip is enabled with the optimal artificial hyperspectral color vision as an integral part of the machine vision system.

EXPERIMENT

Figure 7A:
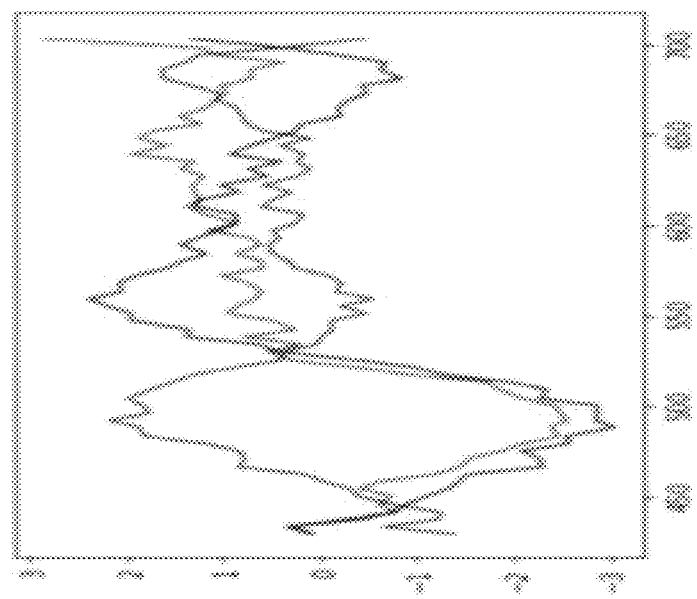
FIG. 7A is a graphical representation of an International Commission on Illumination (CIE) sensitivity function and FIG. 7B is a graphical representation of CIE filters, in accordance with some embodiments of the present disclosure.
Figure 7B:
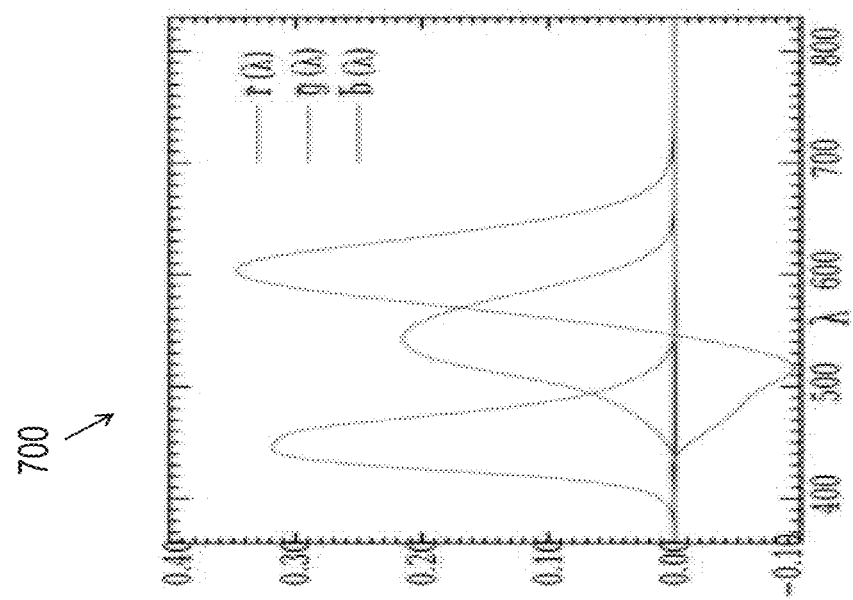

In first experiment, a neural network architecture capable of learning color filters similar to human trichromatic vision. The architecture was designed with three parallel 1×1 convolution layers to learn the filters. For this experiment, the system (100) used data from the visible region (400 nm to 700 nm) of the spectral signature. This data is used as an input, and the material label is obtained from the ground truth file. Filters learned from the model as shown in FIG. 7A, a graphical representation, which represents sensitivity function (i.e., an International Commission on Illumination (CIE) sensitivity function) has similarities to human vision but also distinct. In another experiment, using CIE filters as shown in FIG. 7B, a graphical representation, for learned filters and comparing the results to the first experiment. It is discovered that learned filters outperformed the model using CIE filters, implying that CIE weights may not be ideal. The system (100) is also discovered that each learned primitive is one to one related with one of the CIE filters when the system (100) used Spectral Angle Mapper (SAM). The table below contains detailed values. Each value in the table shows the angle (in degrees) between two vectors, and the lower the angle, the more closely the two curves are represented.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the problem of machine vision. The adequate number of primitives varies depending on the set of materials to be seen by a machine. Usually, color is being used as a discriminator, which can aid in locating the target material. To determine the optimal numbers of primitives is practically impossible as this entail changing sensors or filters dynamically during a robot/machine operation. Embodiments herein provide a method and system for a hyperspectral artificial vision for machines. The system receives a hyperspectral signal of a target material as an input to a neural network model. The system initializes by selecting the number of primitive layers to be used. The system iteratively cycles through all training data (pixels) and updating weights for each unsuccessful material class prediction. Model with two primitives serves as baseline, after which the system adds another primitive layer and repeats the training procedure. The system keeps repeating these processes until obtains convergence. Where the system come to a halt, the system obtains the optimal number of primitives for the given materials. The generated new color pixel is used as a discriminator to aid in locating the target material. The new artificial color is a mixture of weighted chromatic primitives which are optimized for sensitivity/(Spectral Response Functions) SRFs.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising steps of:
receiving, via an input/output interface, a hyperspectral signal of a target material to be detected as an input to a neural network model, wherein the hyperspectral signal comprises a plurality of spectral bands;
reshaping, via one or more hardware processors, each signal vector of the plurality of spectral bands to a predefined shape;
dividing, via the one or more hardware processors, the reshaped signal vector of the plurality of spectral bands into a plurality of batches;
training, via the one or more hardware processors, the neural network model iteratively for each of the plurality of batches of the reshaped signal vector to update weight for each unsuccessful material class prediction;
initializing, via the one or more hardware processors, two or more chromatic primitives of the trained neural network model;
optimizing, via the one or more hardware processors, a chromatic primitive sensitivity function using an adaptive moment estimation to achieve optimized weights of the initialized two or more chromatic primitives;
evaluating, via the one or more hardware processors, performance of the neural network model at each iteration to obtain two or more chromatic primitives from the plurality of initialized artificial color primitives, wherein halting the training of the neural network model when convergence of the two or more chromatic primitives is obtained;
generating, via the one or more hardware processors, a new artificial color value for one or more pixels by combining nodes of the each of the obtained two or more chromatic primitives, wherein the new artificial color is a combination of signals created by a linear combination of two or more chromatic primitives; and
predicting, via the one or more hardware processors, an image for the generated new color using the learned two or more chromatic primitive sensitivity functions to detect the target material.

2. The processor-implemented method of claim 1, wherein the trained neural network model is enabled with color sensitive functions and two or more chromatic primitives to run on a neuro-morphic chip.

3. The processor-implemented method of claim 2, wherein the neuro-morphic chip is enabled with an optimal artificial hyperspectral color vision as an integral part of a machine vision system.

4. The processor-implemented method of claim 1, wherein the two or more chromatic primitives varies depending on the target material to be seen by a machine.

5. The processor-implemented method of claim 1, wherein the two or more chromatic primitives are learned optimal chromatic primitive sensitivity function.

6. The processor-implemented method of claim 1, wherein the generated new color pixel is used as a discriminator to aid in locating the target material.

7. The processor-implemented method of claim 1, wherein the hyperspectral signal comes from a ground sample in case of a spectrometer data, wherein the hyperspectral signal come as a sequence of signals from a grid of rows and columns.

8. The processor-implemented method of claim 1, wherein the new artificial color is a mixture of weighted chromatic primitives which are optimized for sensitivity or SRF.

9. A system comprising:
an input/output interface to receive a hyperspectral signal of a target material to be detected as an input to a neural network model, wherein the hyperspectral signal comprises a plurality of spectral bands;
a memory in communication with the one or more hardware processors, wherein the one or more hardware processors are configured to execute programmed instructions stored in the memory to:
reshape each signal vector of the plurality of spectral bands to a predefined shape;
divide the reshaped signal vector of the plurality of spectral bands into a plurality of batches;
train the neural network model iteratively for each of the plurality of batches of the reshaped signal vector to update weight for each unsuccessful material class prediction;
initialize two or more chromatic primitives of the trained neural network model;
optimize a chromatic primitive sensitivity function using an adaptive moment estimation to achieve optimized weights of the initialized two or more chromatic primitives;
evaluate performance of the neural network model at each iteration to obtain two or more chromatic primitives from the plurality of initialized artificial color primitives, wherein halting the training of the neural network model when convergence of the two or more chromatic primitives is obtained;
generate a new artificial color value for one or more pixels by combining nodes of the each of the obtained two or more chromatic primitives, wherein the new artificial color is a combination of signals created by a linear combination of two or more chromatic primitives; and
predict an image for the generated new color using the learned two or more chromatic primitive sensitivity functions to detect the target material.

10. The system of claim 9, wherein the trained neural network model is enabled with color sensitive functions and two or more chromatic primitives to run on a neuro-morphic chip.

11. The system of claim 10, wherein the neuro-morphic chip is enabled with an optimal artificial hyperspectral color vision as an integral part of a machine vision system.

12. The system of claim 9, wherein the two or more chromatic primitives varies depending on the target material to be seen by a machine.

13. The processor-implemented method of claim 1, wherein the two or more chromatic primitives are learned optimal chromatic primitive sensitivity function.

14. The system of claim 9, wherein the generated new color pixel is used as a discriminator to aid in locating the target material.

15. The system of claim 9, wherein the hyperspectral signal comes from a ground sample in case of a spectrometer data, wherein the hyperspectral signal come as a sequence of signals from a grid of rows and columns.

16. The processor-implemented method of claim 1, wherein the new artificial color is a mixture of weighted chromatic primitives which are optimized for sensitivity or SRF.

17. One or more non-transitory machine-readable information storage mediums comprising one or more instructions which when executed by one or more hardware processors cause:

receiving, via an input/output interface, a hyperspectral signal of a target material as an input to a neural network model, wherein the hyperspectral signal comprises a plurality of spectral bands;

reshaping, via one or more hardware processors, each signal vector of the plurality of spectral bands to a predefined shape;

dividing, via one or more hardware processors, the reshaped signal vector of the plurality of spectral bands into a plurality of batches;

training, via the one or more hardware processors, the neural network model for each of the plurality of batches;

initializing, via one or more hardware processors, two or more chromatic primitives of the trained neural network model;

optimizing, via the one or more hardware processors, a chromatic primitive sensitivity function using an adaptive moment estimation to achieve optimized weights of the initialized two or more chromatic primitives;

evaluating, via the one or more hardware processors, performance of the neural network model at each iteration to obtain two or more chromatic primitives from the plurality of initialized artificial color primitives, wherein halting the training when convergence is obtained;

generating, via the one or more hardware processors, a new artificial color value for one or more pixels by combining nodes of the obtained each of the two or more chromatic primitives, wherein new artificial color is a combination of signals created by a linear combination of two or more chromatic primitives; and predicting, via the one or more hardware processors, an image for the generated new color using the learned two or more chromatic primitive sensitivity function to detect the target material.

18. The one or more non-transitory machine-readable information storage mediums of claim 17, wherein the trained neural network model is enabled with color sensitive functions and two or more chromatic primitives to run on a neuro-morphic chip.

19. The one or more non-transitory machine-readable information storage mediums of claim 17, wherein the two or more chromatic primitives varies depending on the target material to be seen by a machine.

20. The one or more non-transitory machine-readable information storage mediums of claim 17, wherein the two or more chromatic primitives are learned optimal chromatic primitive sensitivity function.

* * * * *